UNITED STATES PATENT OFFICE.

LEVI M. STOCKTON, DAVID STOCKTON, AND WILLIAM A. WARD, OF LONDON, CANADA.

IMPROVEMENT IN TANNING COMPOSITIONS.

Specification forming part of Letters Patent No. 153,464, dated July 28, 1874; application filed April 17, 1874.

*To all whom it may concern:*

Be it known that we, LEVI MANUEL STOCKTON, DAVID STOCKTON, and WILLIAM ALEXANDER WARD, of London and Dominion of Canada, have invented a new and useful Tanning Composition; and we do hereby declare that the following is a full, clear, and exact description thereof, that will enable others skilled in the art to which it appertains to make and use the same.

The object of our invention is to produce a new and very cheap composition to be used in the tanning of hides and skins, and for other similar purposes, by which they are speedily and reliably tanned, and the leather rendered more durable than when treated by any other composition.

To enable others to make and use our composition, we will now more definitely describe the same, and the proportions in which it may be used to the best advantage.

To tan thirty common cow or other hides, with or without the hair on them, we use the following ingredients and proportions: Two hundred pounds of cutch or terra japonica are dissolved in two and one-half barrels of boiling water. We then dissolve three ounces of cream of tartar and two and one-half ounces of soda, and mix it with the former solution. Then one pail of this solution is mixed with four pails of water, one-half pound of alum, one quart of salt, and one-half ounce of tartar-emetic, and the composition is ready for application to the hides.

Having thus described our invention, what we claim, and desire to secure by Letters Patent, is—

The composition herein described, consisting of a solution of cutch or terra japonica, cream of tartar, soda, alum, salt, and tartar-emetic, substantially as and for the purpose set forth.

In testimony that we claim the foregoing we have hereunto set our hands this 18th day of February, 1874.

LEVI MANUEL STOCKTON.
DAVID STOCKTON.
WILLIAM ALEXANDER WARD.

Witnesses:
  H. A. WILKENS,
  JOHN SKINNER.